United States Patent Office 3,353,689
Patented Nov. 21, 1967

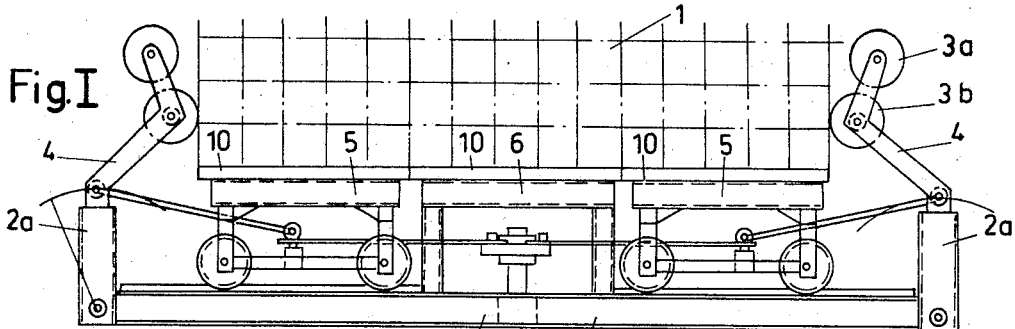
Fig. I
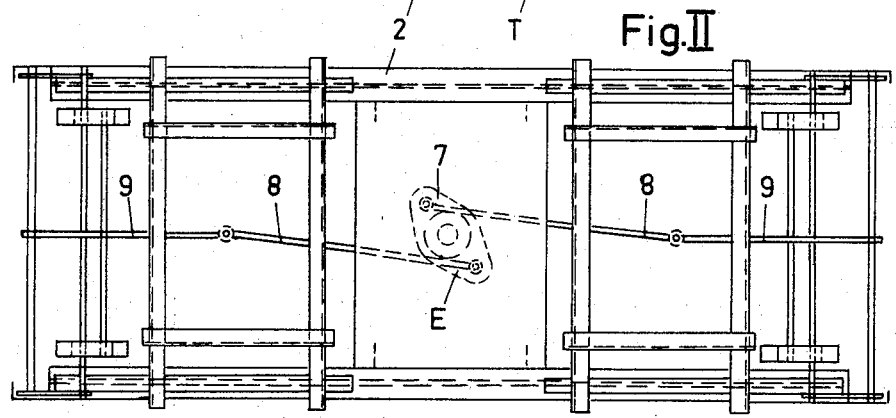
Fig. II
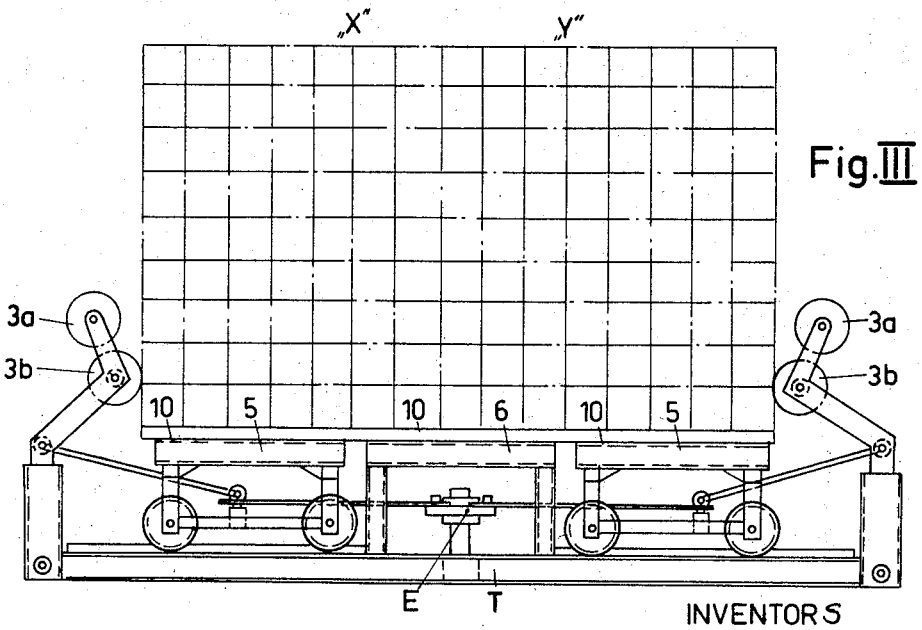
Fig. III
INVENTORS
Wilhelm Dankelmeier and
Wolfgang Schumacher,
By Pierce, Scheffler & Parker
their Attorneys

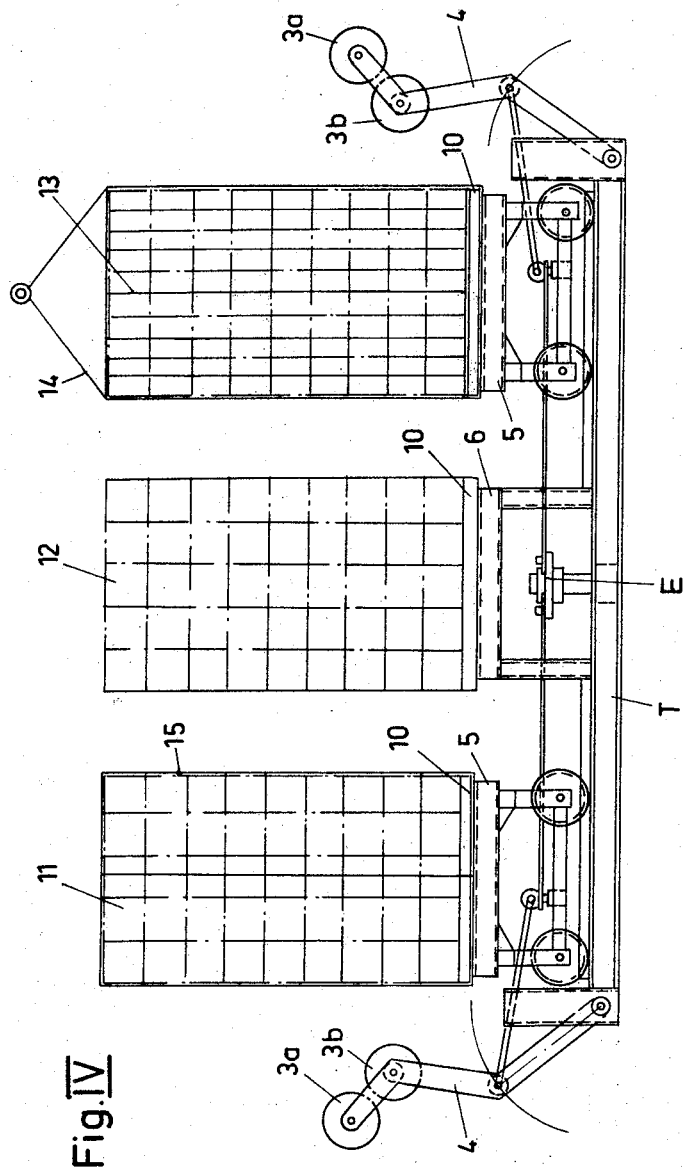

3,353,689
APPARATUS FOR DIVIDING HARDENED PILES OF STONE
Wilhelm Dankelmeier, Hausbergerstr. 29, Neesen uber Minden, Germany, and Wolfgang Schumacher, Untere Bockgasse 6, Wurzburg, Germany
Filed Feb. 9, 1965, Ser. No. 431,419
Claims priority, application Germany, Feb. 11, 1964, P 33,567
3 Claims. (Cl. 214—6)

ABSTRACT OF THE DISCLOSURE

The present invention relates to a process of, and apparatus for, separating stacks of blocks such as stones, bricks and the like used for building, into separate smaller stacks.

In the production of hardened or baked hydraulic stones like chalky sandstones, clinkers or the like the handling due to transportation from the hardening furnace to the building yard causes considerable breakage of material today.

As to the conventional processes the piles of stone leaving the furnace, e.g., in lengths of 1800–2000 mm. at a breadth of totally about 1200 mm., i.e., in single piles of 240–300 mm., according to the size of stones respectively with about a distance of 40 mm. from each other at the same length are seized by dint of stone nippers, hereby squeezed, loaded on trucks from which they are tilted off in the building yard. The stones are then singly piled up on the ground of the pallets of about 600 x 1100 mm. as commonly used in building. Sometimes they are also piled up already on pallets by hand at the manufacturer's by using clamping devices according to processes known.

The repeated handling of the stones by hand, especially the piling up in the building yard, is not only uneconomical but above all brings about an extraordinary high rate of breakage which is still increased by the transportion by lifting cars or other usual loading—or unloading cars, let alone the prohibition of the simple tilting off in concentration areas suffering from lack of room.

This is to be eliminated by the invention which provides simple processes and apparatuses with the help of which the rate of breakage of stones on the way from the manufacturer's until they are used in the building yard is reduced to a minimum by directly loading them on the pallets, i.e., without using the hand, and the stones in that machine palletized form are set off in piles of the above prescribed basic measurement in the building yard by using the common steel cages or belt wrappings.

The object of the present invention is to provide a process and an apparatus for separating stone delivered from a manufacturing or treatment process into separate stacks, these separate stacks of stones being in an easily transportable form. According to the present invention there is provided a process for separating a stack of stones, bricks or like blocks into a plurality of smaller stacks, comprising the steps of delivering stones onto a plurality of closely adjacent pallets, arranging the stones to form a single compact, vertical stack of pre-determined dimensions, and moving the pallets relative to each other in a horizontal direction so that the pallets carry separate stacks of stones.

The advantages besides the reduction of losses by breakage include saving in workers and especially rational storing. The apparatus for carrying out the process according to the invention comprises a plurality of pallets, means capable of locating stones at a required position on the pallets as they are delivered onto the pallets, and an operating device adapted to move the pallets alternately into a closely adjacent and spaced apart relationship, whereby stones delivered onto the pallets which are closely adjacent one another can be engaged by said means to form a single compact vertical stack of predetermined dimensions and whereby upon operation of said device the pallets move relatively away from each other so that each pallet carries a separate stack of stones.

A further advantageous style of embodiment of the apparatus according to the invention consists in that the whole pile on being put on the supports of the pallets of the dividing machine is aligned by lateral guide rollers and adjusting rollers which are hinged by the rods of the disconnecting device.

Finally, an advantageous style of embodiment of the apparatus according to the invention consists in that the dividing machine comprises a firm frame carrying the pallet supports and having lateral, vertical joints, an eccentric sheave is mounted on a pivot about in the middle of the floor of the machine beneath the firm pallet support, rods which are longitudinally, about centrically connected with the movable pallet support members are coupled with the eccentric sheave, the rods on their part are hinged by one axis each with two bent levers which are coupled in the lateral joints on each side, the levers on their upper ends bear the adjusting rollers on a further axis and thereon also on an axis the guide rollers extending to the outside.

The invention is explained in the attached drawings and illustrations of an example as well as in the following description.

It shows:

FIG. I: a side view of the dividing machine according to the invention,

FIG. II: an elevational view of the machine according to FIG. I.

FIG. III: a side view of the machine according to FIG. I, but with a separate hardened pile of stone on the pallets in a position being not disconnected, and FIG. IV: the machine according to FIG. I–III in a disconnected position.

In FIGURE I the hardened pile of stone is designated by 1, which is set off by stone nippers from the hardening carriage on the tightly adjoining pallets 10 in the dividing machine T, the middle fixed support member of the pallet is designated by 6, each of the lateral removable support members by 5. All three support members 6, 5, 5 are disposed in the stationary frame 2 of the dividing machine which has lateral vertical joints 2a.

In FIGURE I the support members and their tightly adjoining pallets 10 are joined together and the pile of stone 1 is represented when already being adjusted, whereas the mechanics of the rods is only indicated.

FIGURE II especially represents the disposition and operation of the rods. About in the middle of the fixed support member 6 near the floor of the frame 2 of the dividing machine there is an eccentric sheave E which is connected with the frame 2 by a firmly resting pivot. From the outer edges 7 of the eccentric sheave extend the rods 8 respectively which are also hinged by pivots, across about centrically on the movable support members 5 of pallets on the pivots are mounted moreover the further rods 9, which on their ends are connected by shafts, which are coupled in the middle of the both lateral bent levers 4, which on their lower ends rest movably in the joints 2a, see FIGURES I, II and IV.

The adjusting rollers 3b are again mounted on shafts at the upper end of the bent lever 4. The bent levers 4 moreover continue to a further opposite bent lug, on the end of which are mounted shafts bearing the guide rollers 3a, as is shown in FIGURE III.

FIGURE III schematically represents the adjusting process to be carried out by means of the guide rollers 3a and the adjusting rollers 3b (putting off a closed pile of stone with the usual stone nippers). The dividing of the palletized stone piles which before were squeezed across is done longitudinally along the lines X, Y.

If by actuating the bent lever or the bent levers 4 according to FIGURE IV the eccentric sheave E is now displaced from its inclined position according to FIGURE II into a somewhat perpendicular position the two outer pallet carriages 5 separate from the firmly fixed support member 6 of pallet. This process causes dividing of the whole pile of stone 1 along the lines X and Y of FIGURE III into three equal single piles 11, 12, 13, resting on their part centrically on the appropriate pallets 10 from where they can be easily handed over for forwarding them on to the building yard with the help of steel cages, a belt wrapping or the like.

In FIGURE IV the left pile bears for example a usual steel or pack belt 15, whereas the right pile shows a basket and cage 14 respectively for transport.

What we claim is:

1. An apparatus for separating a stack of stones, bricks or like blocks into a plurality of smaller stacks, comprising at least three pallets which lie in a horizontal plane, the middle pallet being fixed and each of the outer pallets being supported on a carriage assembly which is movable towards and away from the fixed pallet; means capable of locating stones at a required position on the pallets as they are delivered onto the pallets, and an operating device adapted to move the outer pallets alternately into a closely adjacent and spaced apart relationship, whereby stones delivered onto the pallets which are closely adjacent one another can be engaged by said means to form a single compact vertical stack of pre-determined dimensions and whereby upon operation of said device the pallets move relatively away from each other so that each pallet carries a separate stack of stones; said means capable of locating stones comprising vertically spaced guide rollers and locating rollers operably associated with the operating device.

2. An apparatus as claimed in claim 1, wherein the operating device comprises a crank located beneath the middle pallet and pivotably mounted on a horizontal frame of the apparatus, the crank having two outer projections each connected with a first rod member, the end of each first rod member remote from the crank being pivotably connected with a second rod member and secured to the carriage assembly of one of the outer pallets, and a plurality of bell crank levers each pivotably mounted at one end with a vertical joint of the frame of the apparatus, each second rod member being connected at its end remote from its adjacent first rod member with a first shaft extending between intermediate portions of each pair of facing bell crank levers.

3. An apparatus as claimed in claim 2, wherein the locating rollers are carried by a second shaft mounted between the ends of each pair of facing bell crank levers remote from their mutual pivotal axis, and wherein there is provided an extension of each bell crank lever located at the end of each bell crank lever adjacent said second shaft, the guide rollers being carried by a third shaft mounted between the ends of each pair of facing extensions of a pair of facing bell crank levers.

References Cited
UNITED STATES PATENTS

| | | | |
|---|---|---|---|
| 1,055,490 | 3/1913 | Penfield | 214—6 |
| 1,121,658 | 12/1914 | Penfield. | |
| 1,253,925 | 1/1918 | Boss. | |
| 1,923,729 | 8/1933 | Hull. | |
| 2,769,570 | 11/1956 | Adams. | |
| 3,111,233 | 11/1963 | Raynor | 214—6 |

GERALD M. FORLENZA, *Primary Examiner.*

MARVIN A. CHAMPION, *Examiner.*